Feb. 4, 1969   K. A. HOY   3,425,475

INTEGRAL TIRE AND HUB

Filed Oct. 26, 1966

INVENTOR.
KENNETH A. HOY
BY W. A. Shira, Jr.
ATTY.

3,425,475
INTEGRAL TIRE AND HUB
Kenneth A. Hoy, Kitchener, Ontario, Canada, assignor to B. F. Goodrich Company, New York, N.Y., a corporation of New York
Filed Oct. 26, 1966, Ser. No. 589,657
U.S. Cl. 152—9                  9 Claims
Int. Cl. B60b 9/00; B60c 5/00

ABSTRACT OF THE DISCLOSURE

This invention relates to an integral tire and hub, and more particularly to a low-pressure pneumatic tire, of the "balloon" type, used for low speed vehicles, amphibious and applications where axle loads are light. Preferably, the invention is embodied in a construction formed of elastomeric material without reinforcing cords and secured directly to a hub of small diameter related to the tread diameter, and operating at low inflation pressures in the range of 0–5 pounds per square inch.

---

The principal object of this invention is to provide a one-piece, inflatable low-pressure balloon tire with integral hub for rimless mounting on a driving axle and having an improved means for providing a driving connection between the tire and axle such that the driving torque is transmitted directly from the axle to the tire without generating torsional stresses between the tire and its integral hub, thus eliminating bonding failures of the tire to the hub and providing smooth power transmission. In the preferred embodiment this is effected by integral elastomeric lugs provided on one or both sidewalls of the tire in the region adjacent the end of the hub, which lugs cooperate with complementary surfaces on a driving member in the nature of a hub cap mounted on the axle.

These and other objects and novel features of the invention will become apparent from the disclosure of the presently preferred embodiment, and certain modifications thereof, described with reference to the accompanying drawings, forming a part of this application, and in which.

Figure 1:
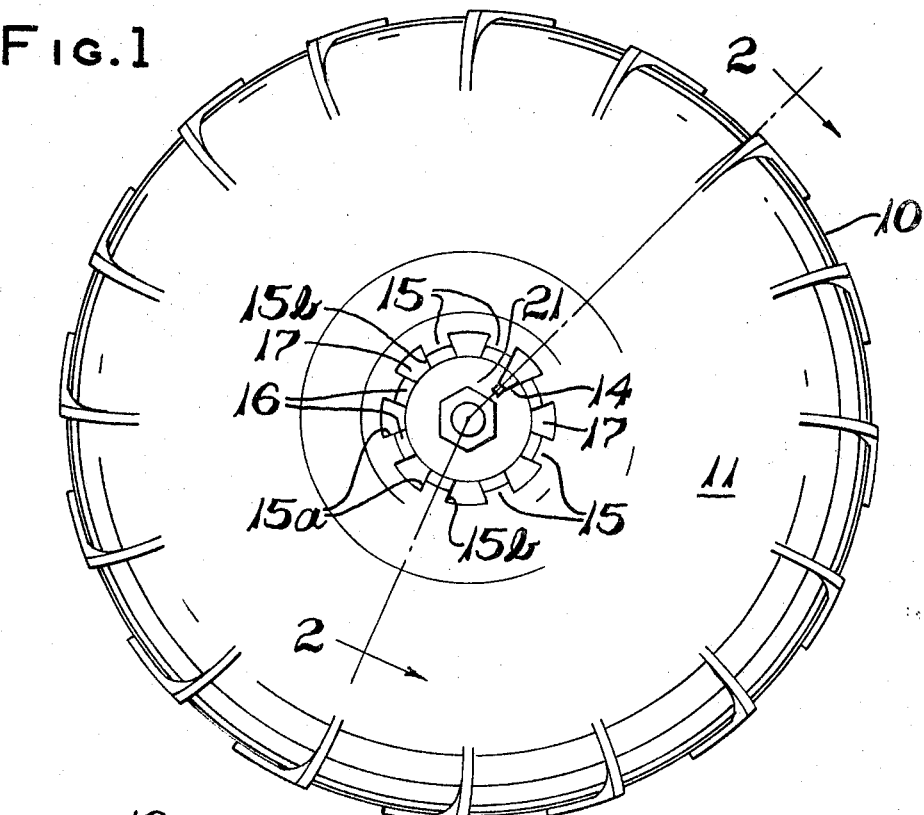
FIG. 1 is a side elevational view of the presently preferred embodiment of an integral tire and hub constructed accordance with this invention, the tire and hub being shown mounted on an axle.

Referring now to FIG. 1, the tire is shown as comprising an annular tread portion 10 and sidewalls 11 with the latter extending generally radially inwardly from the tread. The tread may be provided with traction assisting cleats or ribs and both it and the sidewalls are preferably formed of elastomeric material without cord reinforcements. The radially inner edges of the sidewalls 11 are integrally bonded to the end portions of a rigid hub 12 which is preferably formed of metal having a generally cylindrical shape with flared outer ends 12a. These ends are embedded in and bonded to thickened portions 13 of the sidewalls, see FIG. 2. The hub, sidewalls and tread provide a closed, air-tight compartment or inflation chamber. The sidewalls and tread may be of sufficient stiffness to sustain the loads to which the tire is subjected when the air therein is at substantially atmospheric pressure. Preferably, however, the tire is provided with a valve means for the introduction therein of inflating fluid under low pressure as for example, not in excess of five pounds per square inch. For this purpose, the tire 10 is here shown as having a conventional snap-in type tire valve 14 provided in the wall of the hub, intermediate its ends, and communicating with the interior of the chamber.

The thickened portions 13 of the tire sidewalls extend on both sides of the flared ends of the hub and on the axially outer sides of such ends the portions 13 have a plurality of circumferentially spaced elastomeric lugs 15 for providing a means of torque transmission to the tire and hub assembly. These lugs are preferably formed in the elastomeric material of the sidewalls by molding. As here illustrated the axially outer surfaces of the thickened portions 13 are molded with a chamfered surface 16 and the lugs are formed therein by providing the mold, not shown, with appropriate projections to form circumferentially spaced recesses 17 in the chamfered portion 16. The resulting lugs have parallel side surfaces 15a and 15b extending generally radially inwardly from the outer surface of the chamfered surface 16. The width of the lugs is such as to impart the requisite stiffness to the lugs for enabling them to transmit driving torque directly to the sidewalls 11.

The tire and hub are adapted to be mounted rimlessly on a driving axle 18 and to be driven thereby through a suitable member on the axle interengaging the lugs 15 for torque transmission. In the embodiment shown in FIG. 2, the driving member is shown in the form of a rigid hub cap 19 which has a surface adjacent the tire side wall 11 provided with generally radially extending alternate projections and recesses complementary to the recesses 17 and lugs 15 of the tire and interengaged therewith. The axle 18 extends through a central opening in the hub cap and the latter is secured to the axle by an suitable means capable of preventing relative rotation between the axle and hub cap. In the embodiment illustrated in FIG. 2 the rigid hub cap is removably secured to the axle by a cross pin 20. The invention however is not limited to the particular means for interconnecting the axle and hub cap. For example, the hub cap could be welded, threaded, keyed or otherwise secured to the axle in a manner preventing relative rotation therebetween.

Figures 2, 3:
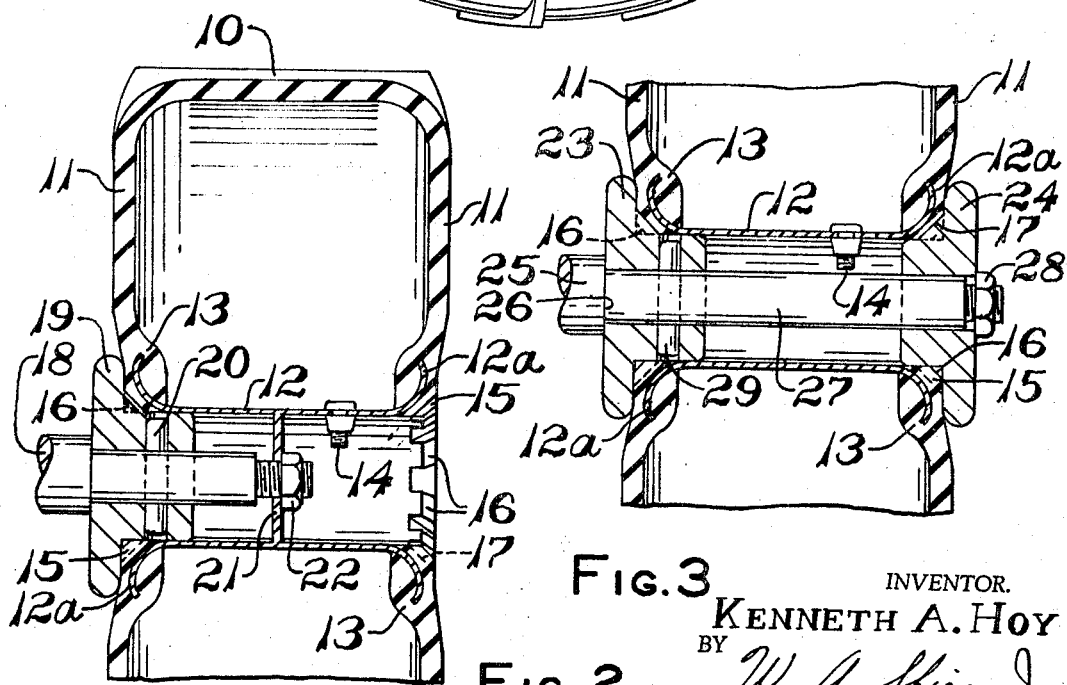
FIG. 2 is a partial sectional view of the embodiment shown in FIG. 1, the section being taken along line 2—2 of FIG. 1.
FIG. 3 is a fragmentary sectional view, taken similar to FIG. 2, of a different embodiment.

The hub 12 of the embodiment of invention illustrated in FIG. 2, has a rigid web 21 extending interiorly radially across the axis of the hub intermediate the ends thereof and rigidly connected to the inner periphery of the hub. The web has a central opening through which the threaded end of the axle extends.

The tire and hub are mounted by inserting the end of the axle in the opening of web 21 and moving the tire as necessary, causing the latter to engage the complementarily shaped recesses in the hub cap 19, and the threaded portion of axle 18 projecting beyond web 21 is provided with a nut 22 which is tightened to insure firm retention of the tire with the hub cap. The integral balloon tire is thus driven directly from the axle eliminating the torsionally imposed shearing forces between the hub and tire which occur when driving is effected through the hub.

Referring now to FIG. 3, another embodiment of this invention is disclosed which incorporates hub caps 23 and 24 in both ends of the hub 12. The rigid web within the hub is omitted in this embodiment but the tire and hub construction is otherwise the same as heretofore described. In the instant embodiment, the axle 25 has an integral shoulder 26 and a reduced diameter portion 27 adapted to pass centrally through the entire hub length. The tire and hub are assembled to the driving axle by positioning one hub cap 23 onto the axle by passing the shaft through a central hole in the hub cap until it engages the shoulder 26. The tire and hub are then placed upon the axle and moved to engage the complementarily shaped recesses and projections with the lugs 15 and recesses on the tire. The second hub cap 24, which has a central axle opening surrounded by generally axially recesses and projections complementary to the lugs and recesses on the tire, is then placed over the end of the axle with the cooperating surfaces on the cap and tire axially positively engaged. A nut 28 is then threaded on the end of the axle and tightened against the axially outer face of the hub cap 24 to retain the tire and hub caps in driving engagement.

A suitable means is provided to prevent relative rotation between at least one of the hub caps and the axle. As here shown this comprises a cross pin 29 extending through the hub cap 23 and axle 25. Although the hub cap 23 is disclosed as provided with means for preventing rotation relative to the axle, it will be apparent that the cap 24 rather than hub cap 23 or both may be prevented from such relative rotation and the means for that purpose are not restricted to the use of a cross pin. Without limitation thereto such means may employ a key, spline or the like or the axle and one or both hub caps may be provided with complementarily shaped polygonal surfaces. Retention of the assembly on the axle also is not limited to threading of the axle and use of a nut as shown. The embodiment of invention illustrated in FIG. 3 as well as that illustrated in FIGS. 1 and 2, therefore, comprises an integral balloon tire and hub adapted to be directly mounted upon an axle and to have the tire directly driven from the axle through the elastomeric lugs on either or both sides of the tire.

It will now be apparent that the invention not only provides a simple, inexpensive construction but one which reduces the danger of bond failure between the hub and sidewalls of the assembly. This is not only due to the fact that the driving torque is directly applied to the sidewalls, thus eliminating the relative displacement between the hub and sidewalls that occurs when driving is effected to the hub, but also by virtue of the clamping action of the side walls to the flared ends of the hub by the hub caps. These and other advantages of the invention are not lost by changes in the details of construction coming within the scope of the appended claims whether or not those changes have been heretofore described or illustrated and hence, all such modifications are deemed within the ambit of the invention.

I claim:

1. A low pressure pneumatic tire with integral wheel hub comprising a rigid generally cylindrical one-piece hollow metal hub, a pair of generally planar sidewalls of elastomeric material integrally joined to said hub only adjacent the ends thereof and extending generally radially outwardly therefrom in axially spaced parallel relationship, an annular tread of elastomeric material integrally joined with the outer periphery of said sidewalls and hub a closed chamber, and a plurality of generally radially extending lugs of elastomeric material arranged in peripherally spaced relation on at least one outer sidewall of the tire adjacent the proximate end of said hub, the lugs being integral with the sidewall thereby providing a positive means for effecting a driving connection between said tire and a driving member.

2. A tire and hub as defined in claim 1 wherein the ends of said hub are flared radially outwardly and each flared end is embedded in a thickened portion at the inner periphery of the adjacent sidewall.

3. A tire and hub as defined in claim 2 wherein the said lugs are formed in each of the said thickened portions of the sidewalls.

4. A tire and hub as defined in claim 1 further comprising valve means communicating with the said closed chamber for introducing an inflating fluid therein.

5. A tire and hub as defined in claim 4 wherein said valve means is positioned in the wall of said hub.

6. A tire and hub as defined in claim 1 in combination with an axle and a hub cap, the said cap having surfaces complementary to and interfitting with said lugs, and means removably interconnecting said hub cap and axle in a manner preventing relative rotation therebetween.

7. A tire and hub as defined in claim 1 having the said lugs at both ends of said hub, an axle extending through said hub, a pair of rigid hub caps on said axle, the said hub caps each having surfaces complementary to and interfittting with the said lugs, means to retain said hub caps in engagement with said lugs, and means to prevent relative rotation between said axle and at least one of said hub caps.

8. The tire and hub as defined in claim 1 wherein said hub has a rigid inner web securely joined to the inner periphery of the hub intermediate its ends and extending radially thereacross perpendicular to the longitudinal axis of said hub, a rigid hub cap having surfaces adapted to cooperatively positively engage said elastomeric lugs in torque transmitting relationship, the said web and hub cap having axially aligned openings, a rigid axle having a threaded outer end extending through the said axially aligned openings, means providing a positive interconnection of said hub cap to said axle preventing relative rotation therebetween, and nut means on the said axle engaging said web and thereby removably retaining said hub cap in engagement with said lugs.

9. The invention defined in claim 1 wherein the ends of said hub curve radially outward and are embedded in elastomeric material of the same composition and stiffness as said sidewalls, the elastomeric material over the axially outer surfaces of said hub having a chamfer formed thereupon, and said lugs being formed in equally spaced relationship in said chamfered portion of said material by projections therefrom each lug having two opposite parallel sides extending generally radially inwardly of the tire from said chamfered surface.

References Cited

UNITED STATES PATENTS 1,901,759   3/1933   Maranville _____ 152—9

FOREIGN PATENTS 354,556   8/1931   Great Britain.

ARTHUR L. LA POINT, *Primary Examiner.*

C. B. LYON, *Assistant Examiner.*